UNITED STATES PATENT OFFICE.

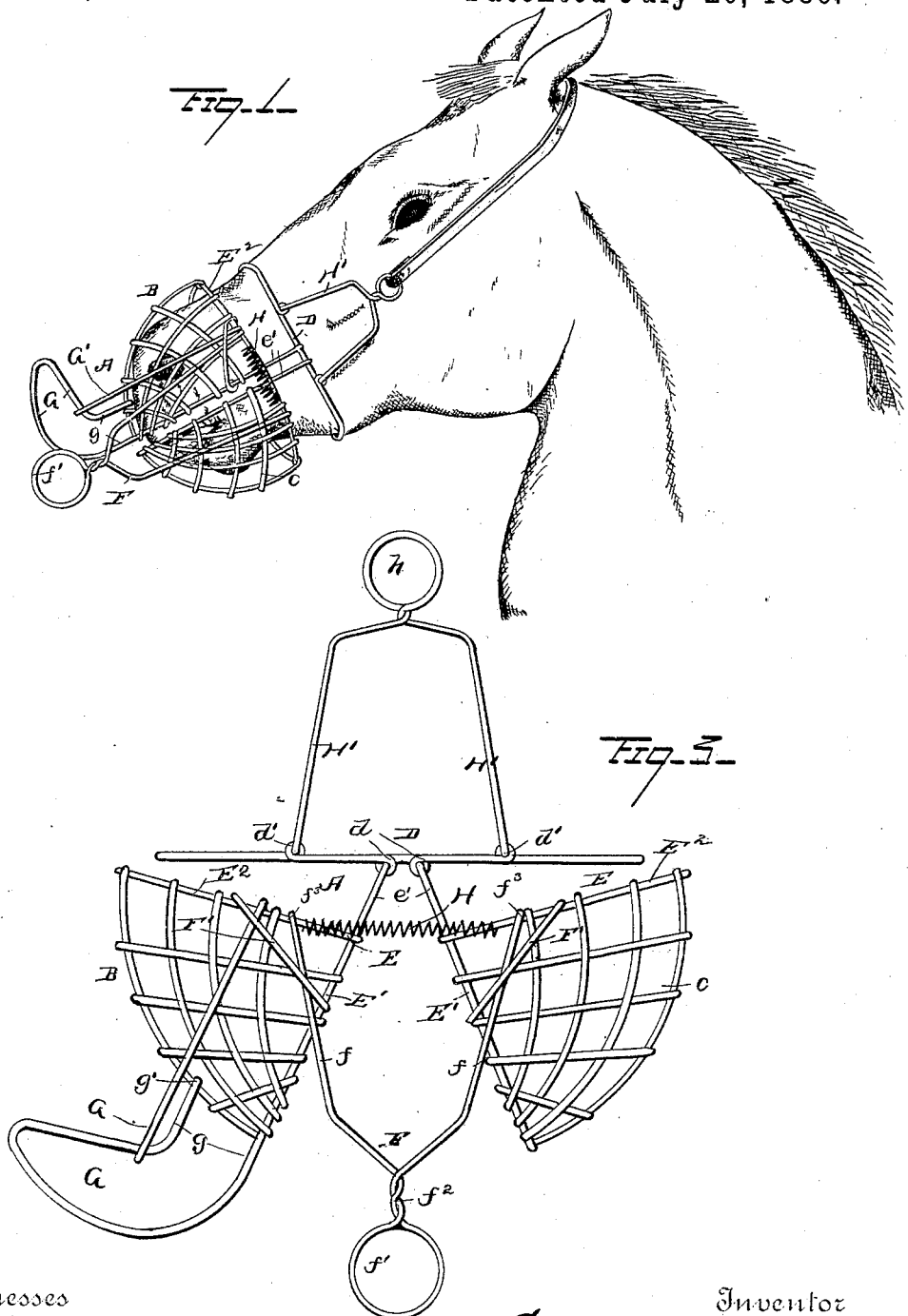

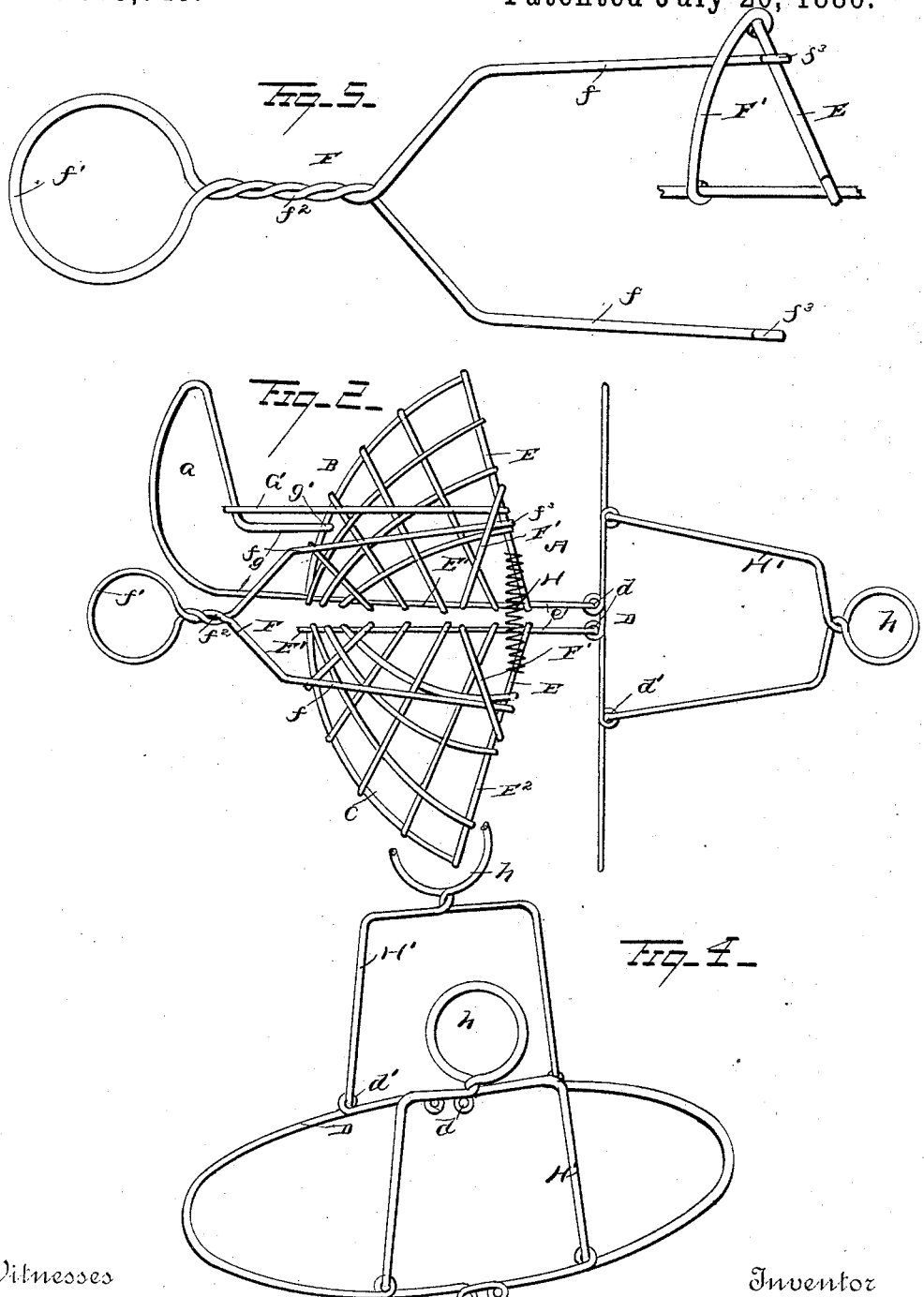

EDUARD B. WEBBER, OF COLLIERVILLE, TENNESSEE.

MUZZLE.

SPECIFICATION forming part of Letters Patent No. 345,749, dated July 20, 1886.

Application filed May 13, 1886. Serial No. 202,083. (No model.)

*To all whom it may concern:*

Be it known that I, EDUARD B. WEBBER, a citizen of the United States, residing at Collierville, in the county of Shelby and State of Tennessee, have invented a new and useful Improvement in Muzzles, of which the following is a specification.

My invention relates to improvements in muzzles for domestic animals; and it consists of the peculiar combination and novel construction and arrangement of the various parts for service, substantially as hereinafter fully set forth, and particularly pointed out in the claims.

The primary object of this invention is to provide an improved muzzle which can be easily and readily applied to a horse to prevent it from destroying corn or trees while it is in pasturage, and which will permit the animal to graze when it lowers its head to the ground, and which can be also applied to a cow or calf to prevent it from sucking.

A further object of my invention is to provide the muzzle with novel means for effectively closing the sections thereof when the animal elevates its head, and thus prevent it from destroying corn, trees, &c.; to provide the muzzle with means for opening one section thereof when the head of the animal is lowered to the ground; and, finally, to provide means for securely holding the muzzle in proper position on the head, all as more fully described presently.

In the accompanying drawings, Figure 1 is a view showing my improved muzzle adjusted for use upon an animal. Fig. 2 is a side elevation thereof detached from the animal, showing the sections of the muzzle closed or shut together. Fig. 3 is a like view with the sections opened. Fig. 4 is a detached view of the carrying-bail having the loops for securing the device to the animal's head. Fig. 5 is a detail view of one of the elevator-arms.

Referring to the drawings, in which like letters of reference denote corresponding parts in all the figures, A designates a muzzle for domestic animals embodying my invention, which consists, essentially, of the upper and lower sections, B and C, respectively, a carrying-bail, D, means for securing the device upon the animal's neck and head, and the opening or elevator arms F.

Each of the sections B and C has a frame, E, over which the wires that form the muzzle are arranged and secured in place, to prevent the animal from having access to an object exterior to the muzzle, and each of these frames E is composed of curved rods or bars E′ and E². The rods or bars E′ are arranged in substantially a horizontal position, and the rods E² are arranged at right angles to the rods E′ and in a vertical position, or nearly so, and the ends of the said rods or bars are connected or secured rigidly together to form one of the sections of the muzzle, the open shield of netting or gauze being secured in any suitable manner to the frame.

The carrying-bail D is made of such shape and size that it fits snugly over the animal's nose below or above its eyes, and near or at its middle the bail is provided with eyes or rings $d$, to which are loosely and pivotally connected the extended ends $e'$ of the rods E′ of the sections of the muzzle.

The upper section of the muzzle B fits over and above the nose of the animal, and the lower section, C, fits beneath and under the jaws of the animal, to effectually prevent it from eating or destroying corn, trees, shrubbery, &c., and the sections are free to move on their pivots formed by the extended ends $e'$ joining eyes $d$, so that a space is provided between the horizontal bars or rods E′ of the sections to permit the animal to graze.

F designates the elevator-arms, which are arranged on opposite sides of the muzzle and project beyond the same, so that they will strike the ground in advance of the muzzle, and serve to open or distend the sections thereof to permit the animal to graze freely. These elevator-arms F are each made of a single piece of wire, which is bent to form the side rods or bars, $f$, and then to form the ring or loop $f'$, and the twisted portion $f^2$ intermediate of the rods and ring. The twisted portion $f^2$ braces and strengthens the arms $f$ and the ring or loop, and the said ring comes in contact with and slides freely over the ground. The rods $f$ are pivotally connected at their rear ends to the upper and lower sections of the muzzle, as at $f^3$, and they are free to move laterally or swing outwardly from the muzzle under the movement of the animal's head, the outward movement of the said arms being limited by short stop-wires F', which fit over the rods $f$ near their pivoted ends, and out of contact therewith when lying against the muzzle to permit a limited play of the arms, and are secured at their ends to the upper section of the muzzle. The rods $f$ are free to expand or move away from each other when the sections of the muzzle are distended to permit the free movements of the sections.

The upper section, B, of the muzzle carries a hook-shaped projection, G, that assists the elevator-arms F in elevating the section B away from the lower section when the animal lowers its head to the ground to graze, and this projection is formed of a single piece of wire, so as to provide two curved arms, $g$, which are arranged nearly parallel with each other, and extend forwardly or beyond the muzzle, and the arms are then bent upwardly to lie above the latter, the ends of the wire that form the arms $g$, as at $g'$, being securely attached to or connected with the upper section, B, of the muzzle, whereby when the animal lowers its head the projection strikes the ground together with the elevator-arms, and thus assists the arms to elevate the upper section, B, away from the lower section to provide an open space.

The lower section, C, is held rigidly in place under the animal's lower jaw, or only a very limited movement is permitted thereat, and when the animal walks with its head lowered to the ground the curved arms of the projections and the rings of the elevator-arms slide freely and unobstructedly over the ground. Upon the animal raising its head the upper section is returned to its closed position by gravity or its own weight; but to more effectively and positively close the sections of the muzzle together, I provide coiled springs H, which are attached at their ends to the sections B and C of the muzzle at or near the pivoted ends of the latter, as will be readily seen by reference to the drawings. These springs, if desired, may be omitted and the upper section close by gravity alone; but I prefer to employ them to make the device more efficient. The springs are distended, when the sections are opened, by the elevator-arms and the projection striking the ground, and they close or draw together to shut the muzzle when it is elevated from the ground. The hook-shaped projection is braced and strengthened and held rigidly in its proper position by rods or bars G', which are connected to the projection at one end, and to the upper section, B, of the muzzle at their opposite ends, as shown.

H' designates the swinging loops, which provide the means for securing the muzzle upon the neck of the animal. The extremities of the arms of the loops are pivotally connected to eyes $d'$ of the carrying-bail D, and at their other ends the loops are provided with eyes $h$, through which are passed the ends of the halter, rope, or like flexible means, as shown in Fig. 1, to connect the free ends of the loop H' together, and cause them to bear upon the neck or against the sides of the head of the animal to retain the muzzle in place.

The operation of my invention will be readily understood from the foregoing description, taken in connection with the drawings. To adjust the device upon an animal's head, the carrying-bail is first adjusted over the nose to bring the sections B and C in proper position over and under the nose and jaws of the head, after which the free ends of the loops $h$ are turned to a vertical position, so that they bear against the neck or sides of the head of the animal, and are adapted to receive a halter, rope, or like flexible means to effectively secure the muzzle in place. When the animal lowers its head to the ground, the elevator-arms and projection strike the ground and force the upper section away from the lower section, and thus permit the animal to graze; and when the head is elevated the springs draw the sections together, to prevent the animal from having access to corn, trees, &c., and thus obviate the danger of the animal destroying the corn, &c. The muzzle can also be applied to a calf to wean it, to a cow to prevent it from sucking, or, in fact, upon any animal to which it is desired to apply it.

By hinging or pivoting the sections B and C together at both sides, they are permitted to move freely, and at the same time prevented from binding upon or scraping the animal's nose, and thereby prevented from injuring it.

The muzzle is simple and strong in construction, cheap and inexpensive to manufacture, and during a course of experiments I have found that it gives good results when in practical use.

Various slight changes in the form and proportion of parts can be made without departing from the principle or sacrificing the advantages of my invention.

The rings or loops $f'$ of the elevator-arms extend or project beyond the projection G, and when the rings of the arms are in contact with the ground, and the animal moves its head to one side, the arms F are inclined and yield to one side, to permit the animal to move its head in that direction with great ease and freedom.

Having thus fully described my invention, what I claim as new, and desire to secure by Letters Patent, is—

1. In a muzzle, the combination of a carrying-bail adapted to be secured upon an animal's nose, a lower section and an upper section pivotally connected to the bail, the elevator-arms arranged on opposite sides of the muzzle, and a curved projection carried by the upper section for assisting the arms in elevating and forcing the sections apart when the arms strike the ground, substantially as described.

2. In a muzzle, the combination of the pivoted sections, the elevator-arms connected at their rear ends to both of the sections, and arranged at the sides of and projecting beyond the sections, and the springs connecting the sections for closing them when the elevator-arms are out of contact with the ground, substantially as described.

3. In a muzzle, the combination of the pivoted upper and lower sections, a projection, G, carried by the upper section, and having the arms $g$ and the upwardly and forwardly curved end $g'$, the braces G', connected with the upper section and the curved end $g'$, and the coiled spring intermediate of the sections for closing them, substantially as described.

4. As a new article of manufacture, a muzzle for animals, comprising a carrying-bail, D, the muzzle-sections pivoted thereto, the coiled springs connecting the sections at or near their pivoted ends, the projection carried by one of the sections, the elevator-arms arranged at the sides of the muzzle, and the loops pivoted to the bail and having the eyes at their free ends, through which a rope or like flexible means is passed to secure the loops together, substantially as described.

5. The combination, with the pivoted muzzle-sections, of the elevator-arms carried by the same and arranged at opposite sides thereof, and projecting at their free ends beyond the muzzle, substantially as described.

6. The combination, with the pivoted muzzle-sections, of the elevator-arms arranged at the sides of and pivotally connected to the sections, and the stops for limiting the swinging movement of the arms, substantially as described.

7. The combination, with the pivoted muzzle-sections, of the elevator-arms carried thereby, and each bent from a single piece of wire to form the side bars, $f$, the loop or ring $f'$, and the intermediate twisted portion, $f^2$, substantially as described.

In testimony that I claim the foregoing as my own I have hereto affixed my signature in presence of two witnesses.

EDUARD B. WEBBER.

Witnesses:
WM. N. MOORE,
WILLIAM T. GILL.